United States Patent
Sedivy

(10) Patent No.: US 9,132,580 B2
(45) Date of Patent: Sep. 15, 2015

(54) EXTRUSION DIE WITH DECKLE SYSTEM AND METHODS OF USING SAME

(71) Applicant: Nordson Extrusion Dies Industries, LLC, Chippewa Falls, WI (US)

(72) Inventor: Jordan L. Sedivy, Chippewa Falls, WI (US)

(73) Assignee: Nordson Corporation, Westlake, OH (US)

( * ) Notice: Subject to any disclaimer, the term of this patent is extended or adjusted under 35 U.S.C. 154(b) by 9 days.

(21) Appl. No.: 14/051,209

(22) Filed: Oct. 10, 2013

(65) Prior Publication Data

US 2015/0104537 A1      Apr. 16, 2015

(51) Int. Cl.
| | |
|---|---|
| B29C 47/16 | (2006.01) |
| B29C 47/00 | (2006.01) |
| B29C 47/08 | (2006.01) |
| B29C 47/92 | (2006.01) |
| B29C 47/70 | (2006.01) |

(52) U.S. Cl.
CPC ............. *B29C 47/16* (2013.01); *B29C 47/0021* (2013.01); *B29C 47/0808* (2013.01); *B29C 47/0816* (2013.01); *B29C 47/92* (2013.01); *B29C 47/70* (2013.01); *B29C 2947/9279* (2013.01); *B29C 2947/92133* (2013.01); *B29C 2947/92447* (2013.01); *B29C 2947/92628* (2013.01); *B29C 2947/92904* (2013.01)

(58) Field of Classification Search
CPC   B29C 47/0816; B29C 47/16; B29C 47/0021; B29C 47/0808; B29C 47/92; B29C 2947/92628; B29C 2947/92904

USPC ........................................................ 425/466
See application file for complete search history.

(56) References Cited

U.S. PATENT DOCUMENTS

| | | |
|---|---|---|
| 2,765,492 A | 10/1956 | Velvel |
| 2,901,770 A | 9/1959 | Beck |
| 2,998,624 A | 9/1961 | Ricketts |
| 3,018,515 A | 1/1962 | Sneddon |
| 3,039,143 A | 6/1962 | Nicholson |
| 3,067,464 A | 12/1962 | Nicholson |
| 3,238,563 A | 3/1966 | Hoffman |
| 3,293,689 A | 12/1966 | Chiselko et al. |
| 3,611,491 A | 10/1971 | Rector |
| 3,711,235 A | 1/1973 | Bunte et al. |
| 3,797,987 A | 3/1974 | Marion |

(Continued)

FOREIGN PATENT DOCUMENTS

| | | |
|---|---|---|
| CA | 2330159 A1 | 12/1999 |
| DE | 2608063 A1 | 9/1977 |

(Continued)

OTHER PUBLICATIONS

European Patent Application No. 14188231.6, Extended European Search Report issued Apr. 1, 2015, 6 pages.

*Primary Examiner* — Yogendra Gupta
*Assistant Examiner* — Joseph Leyson
(74) *Attorney, Agent, or Firm* — Fredrikson & Byron, P.A.

(57) ABSTRACT

In extrusion system includes an extrusion die and a deckle system. In one embodiment, the deckle system includes a deckle rod and a cam member operatively coupled to the deckle rod. A cam controller controls the cam member. The cam member cams with the deckle rod in response to actuation of the cam controller. The camming action forces the deckle rod to seal an end region of the extrusion die.

9 Claims, 7 Drawing Sheets

(56) References Cited

U.S. PATENT DOCUMENTS

| | | |
|---|---|---|
| 3,829,274 A | 8/1974 | Melead |
| 3,832,120 A * | 8/1974 | Shaffer .................. 425/466 |
| 3,840,318 A | 10/1974 | Solop |
| 3,870,454 A | 3/1975 | Penrod |
| 4,008,036 A | 2/1977 | Verlinden et al. |
| 4,057,385 A | 11/1977 | Yazaki et al. |
| 4,248,579 A | 2/1981 | Maejima |
| 4,454,084 A | 6/1984 | Smith et al. |
| 4,659,302 A | 4/1987 | Maejima |
| 4,863,361 A | 9/1989 | Boos |
| 5,395,231 A | 3/1995 | Maejima |
| 5,424,018 A * | 6/1995 | Paul et al. .................. 264/176.1 |
| 5,451,357 A | 9/1995 | Cloeren |
| 5,456,869 A | 10/1995 | Miles et al. |
| 5,484,274 A | 1/1996 | Neu |
| 5,505,609 A | 4/1996 | Cloeren et al. |
| 5,511,962 A | 4/1996 | Lippert |
| 5,582,850 A | 12/1996 | Cloeren et al. |
| 5,679,387 A | 10/1997 | Cloeren et al. |
| 5,830,391 A | 11/1998 | Lamkemeyer et al. |
| 6,017,207 A | 1/2000 | Druschel |
| 6,106,268 A | 8/2000 | Figa et al. |
| 6,287,105 B1 | 9/2001 | Druschel et al. |
| 7,104,778 B2 | 9/2006 | Bomba |
| 2004/0056373 A1 | 3/2004 | Ulcej et al. |
| 2008/0057148 A1 | 3/2008 | Pitch et al. |
| 2011/0206795 A1 | 8/2011 | Ulcej et al. |
| 2013/0122131 A1 | 5/2013 | Sedivy et al. |

FOREIGN PATENT DOCUMENTS

| | | |
|---|---|---|
| DE | 102011002313 A1 | 4/2012 |
| EP | 0579142 A1 | 1/1994 |
| JP | 54-097663 | 8/1979 |
| JP | H04-307220 A | 10/1992 |
| JP | 08142158 | 6/1996 |
| JP | 2002192594 | 7/2002 |
| WO | 9709164 A1 | 3/1997 |
| WO | 99/61218 | 12/1999 |

* cited by examiner

EXTRUSION DIE WITH DECKLE SYSTEM AND METHODS OF USING SAME

TECHNICAL FIELD

This invention relates to an extrusion die with a deckle system and, more particularly, to a deckle system for sealing the outlet orifice of an extrusion die.

BACKGROUND

An extrusion die for extruding thin plastic films has an orifice that extends along the length of the die. In operation, molten polymer flows under pressure through an internal flow passage in the die and leaves the die via the orifice. To control the width of the thin plastic film produced using the extrusion die, for example to make wider or narrower plastic film sheets, the extrusion die includes a deckle system. When used, the deckle system is inserted into the internal flow passage of the die to prevent extrudate from flowing through that portion of the die occupied by the deckle system. In this manner, the deckle system adjusts the width of the die orifice through which molten polymer can flow and, correspondingly, the width of the extruded plastic film produced using the die.

Deckle systems for extrusion dies can have a variety of configurations. The deckles on an extrusion die may be internal to the die, external to the die, or both internal and external to the die. Internal deckles typically include one or more internal deckle members referred to as a deckle quill, flag or plug, and a deckle rod. For example, an internal deckle may include an upper deckle member referred to as a quill, a lower deckle member referred to as a flag or plug, and a deckle rod positioned below the lower deckle member. The different internal deckle components function to fill different sections of the internal flow passage of the extrusion die. For instance, the deckle rod is typically positioned in a transition zone of the extrusion die to block that portion of the internal passage of the die. The transition zone is generally the location where the internal passage narrows down to the orifice.

A problem encountered in extrusion dies with internal deckles is the lack of adequate sealing contact between the deckle rod and the internal walls of the die. A deckle rod may not adequately seal the internal passage due to manufacturing tolerances, thermal expansion of the components, wear of the components, or other issues. This may result in molten polymer leaking out of regions where the deckle rod is not in sealing contact near an end region of the die orifice. When this occurs, molten polymer can build up in the end region of the die, creating an extruded film of non-uniform width and thickness. Further, polymer accumulation can prevent movement of components of the deckle system, leading to increased replacement and maintenance costs.

SUMMARY

In general, this disclosure relates to an extrusion die with a deckle system that is used to control the width of extrudate discharging from the extrusion die. The deckle system includes a deckle rod that is positioned downstream of an internal deckle member. The deckle rod generally functions to seal an end region of the extrusion die where the internal passageway narrows down to the outlet orifice. In some embodiments, the deckle system has a cam member that engages with the deckle rod. The cam member can press against the deckle rod to provide a force that forces the deckle rod into the narrowing outlet orifice so as to seal the outlet orifice.

In one embodiment, an extrusion die is described that has a manifold, an internal flow passageway, an orifice having an end region, and an internal deckle system. According to the embodiment, the internal deckle system includes a downstream internal deckle member, a deckle rod, a cam member, and a cam controller. The downstream internal deckle member is located within the internal flow passageway and has a downstream edge alongside the deckle rod. The embodiment specifies that the cam member is configured such that in response to actuation of the cam controller, the cam member contacts the deckle rod and thereby forces the deckle rod to seal an end region of the orifice.

BRIEF DESCRIPTION OF THE DRAWINGS

The following drawings are illustrative of particular embodiments of the invention and therefore do not limit the scope of the invention. The drawings are not necessarily to scale and are intended for use in conjunction with the explanations provided in the following detailed description. Embodiments of the invention will hereinafter be described in connection with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

In a thin plastic film production process, an extrusion die is positioned downstream of a feed block, oftentimes with a layer multiplication device positioned between the feed block and the extrusion die. In operation, the feed block is supplied with at least one flow of polymeric material to form a multilayer film. The multilayer film is conveyed from the feed block toward the extrusion die. The extrusion die gives the extruded plastic film its final shape and is generally designed so that molten polymer flows evenly through the die from an inlet manifold to an outlet orifice.

To control the width of extrudate discharging from the extrusion die, the extrusion die includes a deckle system. The deckle system is inserted into the internal flow passage of the die to prevent extrudate from flowing through that portion of the die occupied by the deckle system. The deckle system includes at least one internal deckle member that is positioned within the internal passageway of the die. The deckle system also includes a deckle rod that is positioned downstream of the internal deckle member, for example, in contact with a downstream terminal edge of the internal deckle member. The deckle rod generally functions to seal the end region of the extrusion die where the internal passageway narrows down to the outlet orifice.

As described in greater detail below, embodiments of the disclosure provide a deckle system having a cam member operatively coupled to the deckle rod. The cam member engages with the deckle rod to provide a force directing the deckle rod toward the end region of the extrusion die, for example, into contact with the converging wall surfaces of the extrusion die. The force generated by the cam member can cause the deckle rod to seal the region of the extrusion die occupied by the deckle rod more effectively than if the deckle rod is not pressed by the cam member. In addition, by coupling the cam member to a cam controller, the magnitude of the pressing force applied by the cam member can be adjusted, for example, to compensate for manufacturing tolerances between the deckle rod and the die face, thermal expansion of the components, wear of the components, or the like.

Figure 1:
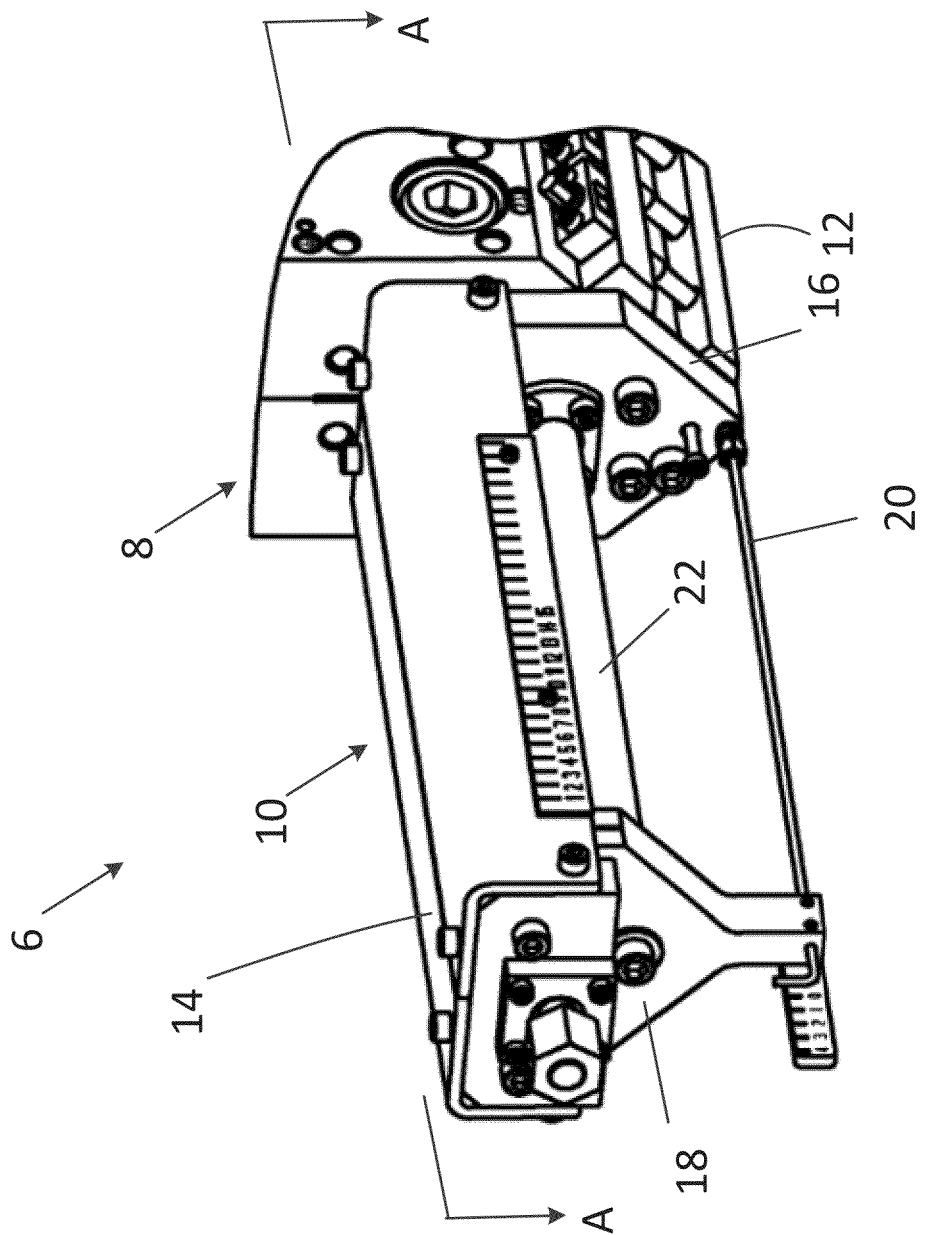
FIG. 1 is a perspective view of an extrusion die system including an extrusion die and deckle system.

FIG. 1 is a perspective drawing of an extrusion die system 6 that includes an extrusion die 8 and an internal deckle system 10 (referred to herein as "deckle system 10"). Extrusion die 8 has an inlet through which polymeric material enters the die (not illustrated in FIG. 1) and an outlet orifice 12 through which extrudate discharges. Extrusion die 8 is attached to deckle system 10 to adjust the width of outlet orifice 12 and, correspondingly, the width of a polymeric sheet produced using the die.

In the embodiment of FIG. 1, deckle system 10 includes a frame member 14 disposed between an end plate 16 and a support plate 18. Deckle system 10 also includes a deckle rod 20 connected to the support plate 18 and a support rod 22 connected to an internal deckle member inside of extrusion die 8. To adjust the width of outlet orifice 12 through which extrudate can discharge, support plate 18 is movable toward end plate 16 along frame member 14. Advancing the support plate 18 toward the end plate 16 causes the support rod 22 to push the internal deckle member further across the extrusion die outlet and also causes the deckle rod 20 to advance further across the extrusion die outlet, shrinking the discharge width of outlet orifice 12. Conversely, retracting the support plate 18 away from the end plate 16 retracts the internal deckle member and the deckle rod 20, enlarging the discharge width of outlet orifice 12. In some embodiments, extrusion die system 6 includes two deckle systems 10, with one deckle system positioned on each side of extrusion die 8 to control the discharge width of outlet orifice 12 from either side. In either case, once outlet orifice 12 is set to a desired width by adjusting the position of support plate 18, the support plate typically held in a fixed position during an extrusion process to produce a polymeric film of fixed width.

Figure 2:
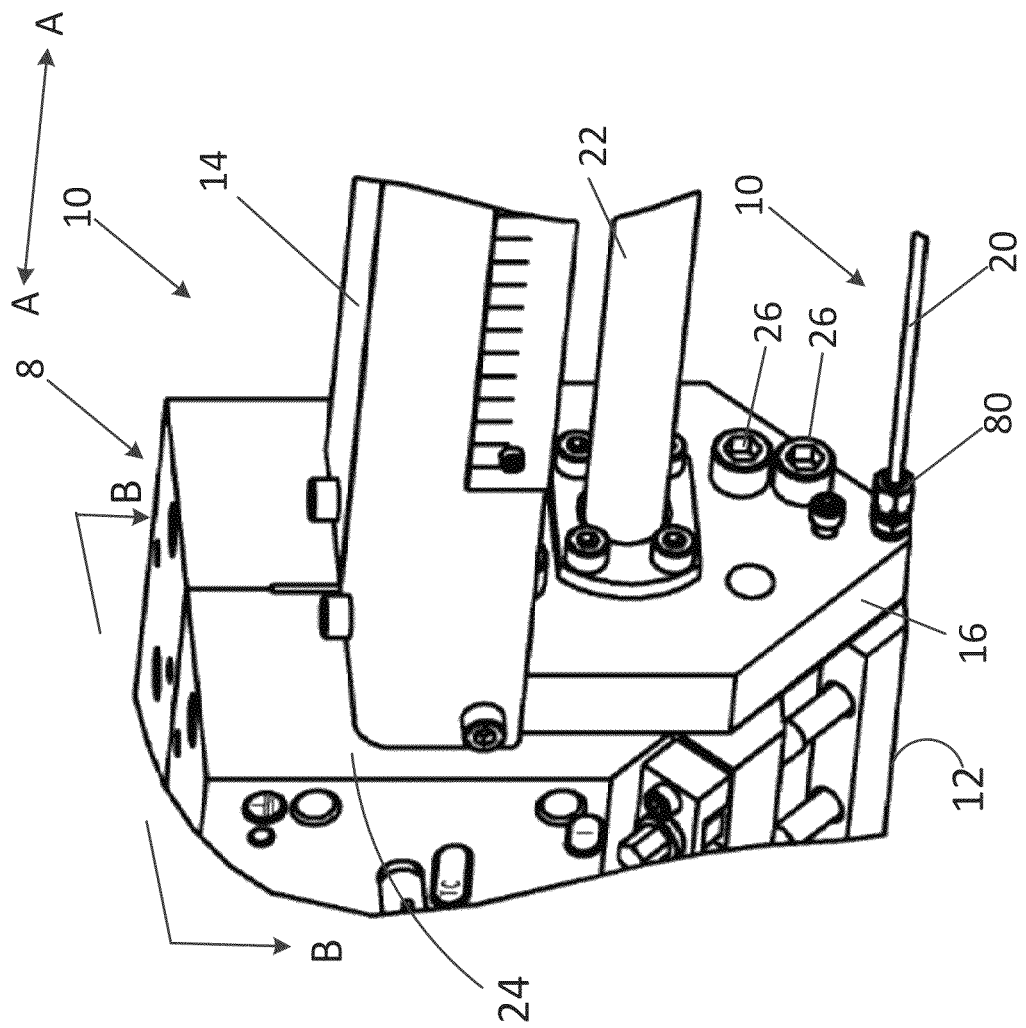
FIG. 2 is an exploded view of the junction between the extrusion die and the deckle in the embodiment of FIG. 1.

To connect deckle system 10 to extrusion die 8, the deckle system can be mounted to the die and secured with a variety of mechanical fixation elements. FIG. 2 is an exploded view of the junction between extrusion die 8 and deckle system 10 in the embodiment of FIG. 1. As shown, end plate 16 of deckle system 10 is configured to be mounted on an end 24 of extrusion die 8. The end plate 16 can be coupled to the extrusion die 8 by mechanical fasteners 26, such as bolt assemblies. Alternatively, the end plate 16 can be welded or otherwise secured to the end 24 of extrusion die 8. Upon mounting deckle end plate 16 to extrusion die 8, the support rod 22 can be connected to an internal deckle member inside of the die so that movement of the support rod moves the internal deckle member. In addition, deckle rod 20 can be installed through end plate 16 to place the deckle rod in communication with an interior of the extrusion die, allowing the deckle rod to be controllably translated along the length of the die to control the discharge width of outlet orifice 12.

Figure 3:
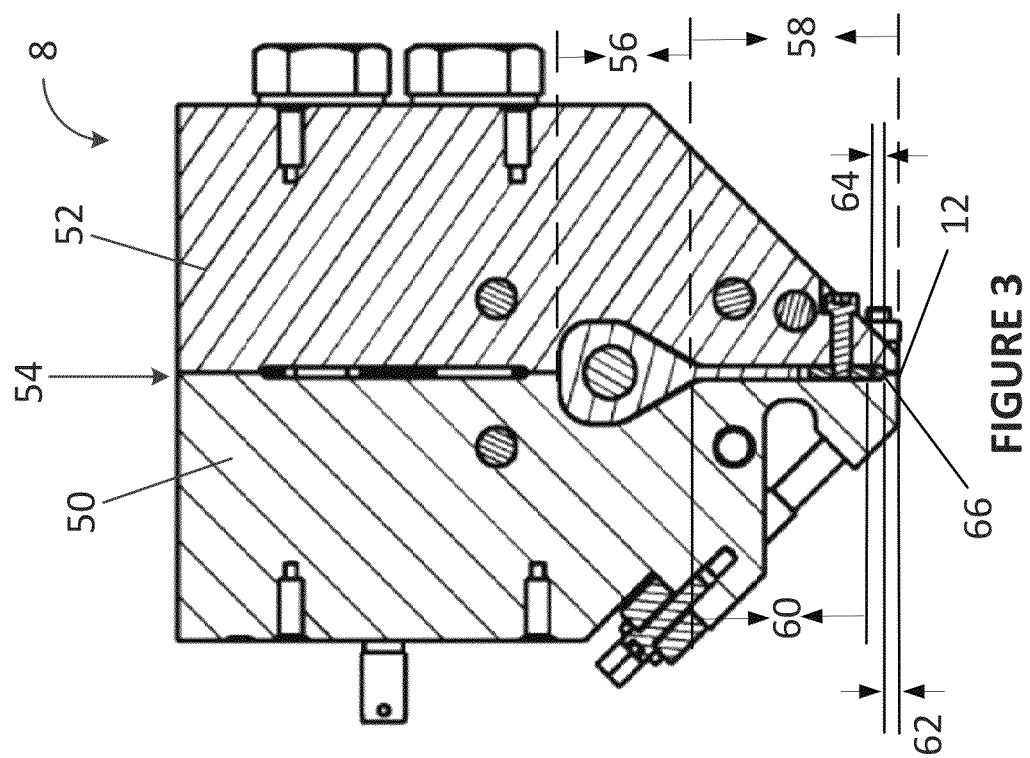
FIG. 3 is a cross-section illustration of the extrusion die in FIG. 2 taken along the B-B line indicated on FIG. 2.

The internal deckle member coupled to support rod 22 and the deckle rod 20 of deckle system 10 are configured to travel within an internal passageway of extrusion die 8 to adjust the width of the die through which molten polymer can flow during operation. FIG. 3 is a cross-section illustration of extrusion die 8 from FIG. 2 taken along the B-B line indicated on FIG. 2. FIG. 3 illustrates one particular configuration of an extrusion die, although it should be appreciated that a deckle system in accordance with the disclosure can be used with any suitable extrusion die and the disclosure is not limited in this respect.

In the embodiment of FIG. 3, extrusion die 8 includes at least one die jaw which, in the illustrated embodiment, includes two opposed die jaws 50, 52. The die jaws 50, 52 create a flow passageway extending from an inlet 54 to the outlet orifice 12. The flow passageway includes a manifold 56, an internal flow passageway 58, and outlet orifice 12. During operation, molten polymer enters the extrusion die at inlet 54, travels through the manifold 56 and internal flow passageway 58, and discharges at outlet orifice 12. One or more process heaters (not shown) coupled to temperature sensors (not shown) may be included along the internal flow passageway 58 to control the properties of the extruded film produced using extrusion die 8. In addition, the spacing between the die jaws 50, 52 can be adjusted by an adjustment mechanism, such as a mechanical drive member, to control the thickness of the extruded film generated using the die. A mechanical or hydraulic drive system is typically coupled to the extrusion die 8 to control this spacing between die jaws 50, 52.

Polymer entering extrusion die 8 passes into manifold 56. In general, manifold 56 is an enlarged opening within the extrusion die that allows polymer flow entering via inlet 54 to spread out across the width of the die before entering the comparatively narrower internal flow passageway 58. In the embodiment of FIG. 3, manifold 56 is illustrated as having an elongated or tear-drop shaped cross-section, although different cross-sectional shapes are both possible and contemplated. Different cross-sectional shapes may be used, for example, depending on the geometry and size of extrusion die 8.

Independent of the size or shape of manifold 56, the manifold forms a continuous flow path with internal flow passageway 58. A first portion of the internal flow passageway 58 is often referred to as the "pre-land channel" 60, while a second portion of the internal flow passageway 58 is often referred to as the "final land channel" 62. In some embodiments, a transition zone 64 connects the pre-land channel 60 to the final land channel 62. In such embodiments, the transition zone 64 may extend from a downstream end region of the pre-land channel 60 to an upstream end region of the final land channel 62. For example, the transition zone 64 is typically the section of the internal flow passageway 58 where the walls of the internal flow passageway converge and transition from having the cross-sectional width of the pre-land channel to having the cross-sectional width of the final land channel. In some embodiments, the transition zone 64 is formed by internal wall surfaces of die jaws 50, 52 that converge to create end walls 66, for example, having a curved or planar shape. During operation, polymer enters the extrusion die 8 at inlet 54 and travels into manifold 56. From manifold 56, the polymer flows into internal flow passageway 58, beginning at pre-land channel 60, converging in transition zone 64, and finally passing through final land channel 62 and out through orifice 12.

Figure 4:
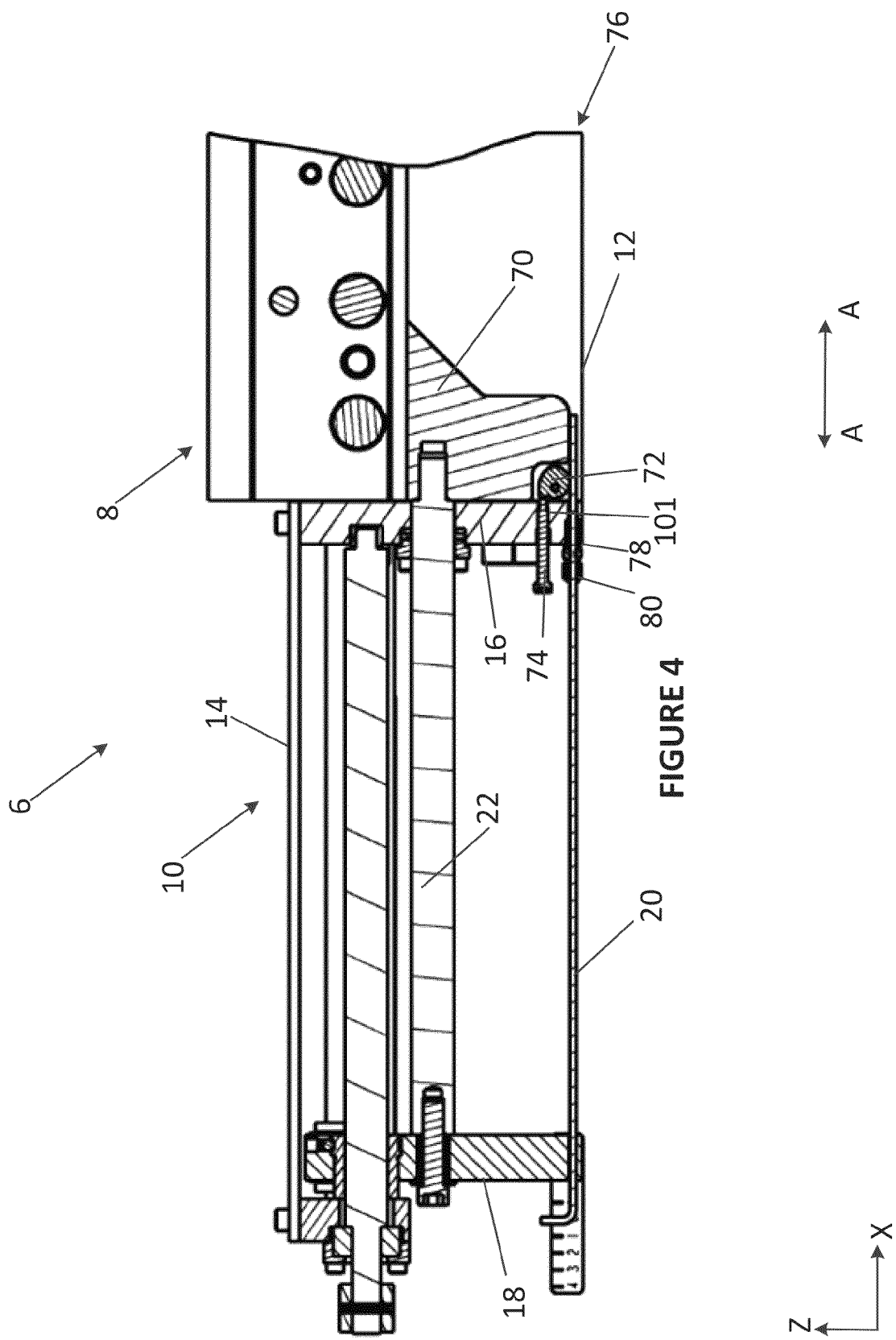
FIG. 4 is a cross-sectional image of the extrusion die system of FIG. 1 taken along the A-A cross-sectional line indicated on FIG. 1.

To control the width of film extruded from extrusion die 8, deckle system 10 (FIG. 1) is inserted into the flow channel extending between die jaws 50, 52 to block the region in which polymer can flow through the die. FIG. 4 is a cross-sectional image of extrusion die system 6 of FIG. 1 taken along the A-A cross-sectional line indicated on FIG. 1. As shown in this embodiment, the deckle system 10 includes one or more internal deckle members 70 (referred to hereinafter as "internal deckle members 70"), the previously-described deckle rod 20, a cam member 72, and a cam controller 74. The internal deckle members 70 and the deckle rod 20 move transversely along a transverse axis A-A of the extrusion die 8 to expand and contract the operational width of the extrusion die. The cam member 72 is operatively coupled to the cam controller 74 and, in some embodiments, pivotally rotatable in response to pressure from the cam controller. Upon actuating the cam controller 74, cam member 72 contacts the deckle rod 20 and force the deckle rod to seal the end region of the extrusion die adjacent the outlet orifice 12.

The internal deckle members 70 are configured (e.g., sized and/or shaped) to be located within the flow passageway between die jaws 50, 52 (FIG. 3) so as to block polymer through that portion of the passageway occupied by the one or more internal deckle members. In one embodiment, the internal deckle members 70 are designed to be located within and thereby fill at least a portion of the manifold 56 (FIG. 3). For example, the internal deckle members 70 may fill the entire cross-sectional area of manifold 56 within the region where the deckle is positioned. In addition to or in lieu of being located in the manifold 56, the internal deckle members 70 are designed to be located within and thereby fill at least a portion of the pre-land channel 60 (FIG. 3). For example, the one or more deckle members 70 may fill the entire cross-sectional area of pre-land channel 60 within the region where the deckle is positioned. In the embodiment illustrated in FIG. 4, the internal deckle members 70 can be moved along the transverse axis A-A by translating the support rod 22 in the positive/negative X-direction indicated on the figure.

Deckle rod 20 is positionable within an end region 76 of extrusion die 8 proximate outlet orifice 12. In embodiments where the flow passageway between die jaws 50, 52 provide a transition zone 64 (FIG. 3), deckle rod 20 is positionable within the transition zone to block polymer flow through that portion of the extrusion die occupied by the deckle rod. Accordingly, internal deckle members 70 and deckle rod 20 can work cooperatively to block different sections of the flow passageway through which polymer would otherwise flow, where the flow passageway not filled with the internal deckle member and deckle rod. For instance, with reference to FIG. 3, internal deckle member 70 may fill at least a portion of manifold 56 and pre-land channel 60 while deckle rod 20 fills transition zone 64.

With further reference to FIG. 4, deckle rod 20 is illustrated as an elongated member having a length equal to least half the cross-sectional width of extrusion die 8. Deckle rod 20 can be a cylindrical member with a length corresponding to the entire length of the extrusion die assembly (sometimes referred to as "full-length" deckle rod). Deckle rod 20 is slidably received by the end plate 16 of the extrusion die 8. The end plate 16 can have an opening 78 shaped to receive the deckle rod 20 along the transverse axis A-A of the die. Deckle rod 20 can be moved along the transverse axis A-A by adjusting a retaining member 80. In one embodiment, the retaining member 80 is a hex-headed bolt and washer assembly that is securable to prevent deckle rod 20 from moving transversely and releasably to allow the deckle rod 20 to slide transversely through the opening 78 in the end plate 16. An operator can loosen the retaining member 80, adjust the position of deckle rod 20 by advancing or retracting the deckle rod, and subsequently tighten the retaining member, thereby adjusting the width of extruded films produced using extrusion die 8.

As briefly discussed above, deckle system 10 in the embodiment of FIG. 4 includes cam member 72 and cam controller 74. Cam controller 74 controls cam member 72 to contact with deckle rod 20, forcing the deckle rod in the downstream direction toward outlet orifice 12 (e.g., the negative Z-direction indicated on FIG. 4). For example, a force provided by cam member 72 on deckle rod 20 pushes the rod flush with (e.g., in contact with) the converging internal wall surfaces in the end region 76 of extrusion die 8. This provides a more effective seal at the end region of extrusion die 8, e.g., by preventing leakage of molten polymer around deckle rod 20, than if the deckle rod is not forcibly pushed by cam member 72 into the end region of the extrusion die.

Figure 5:
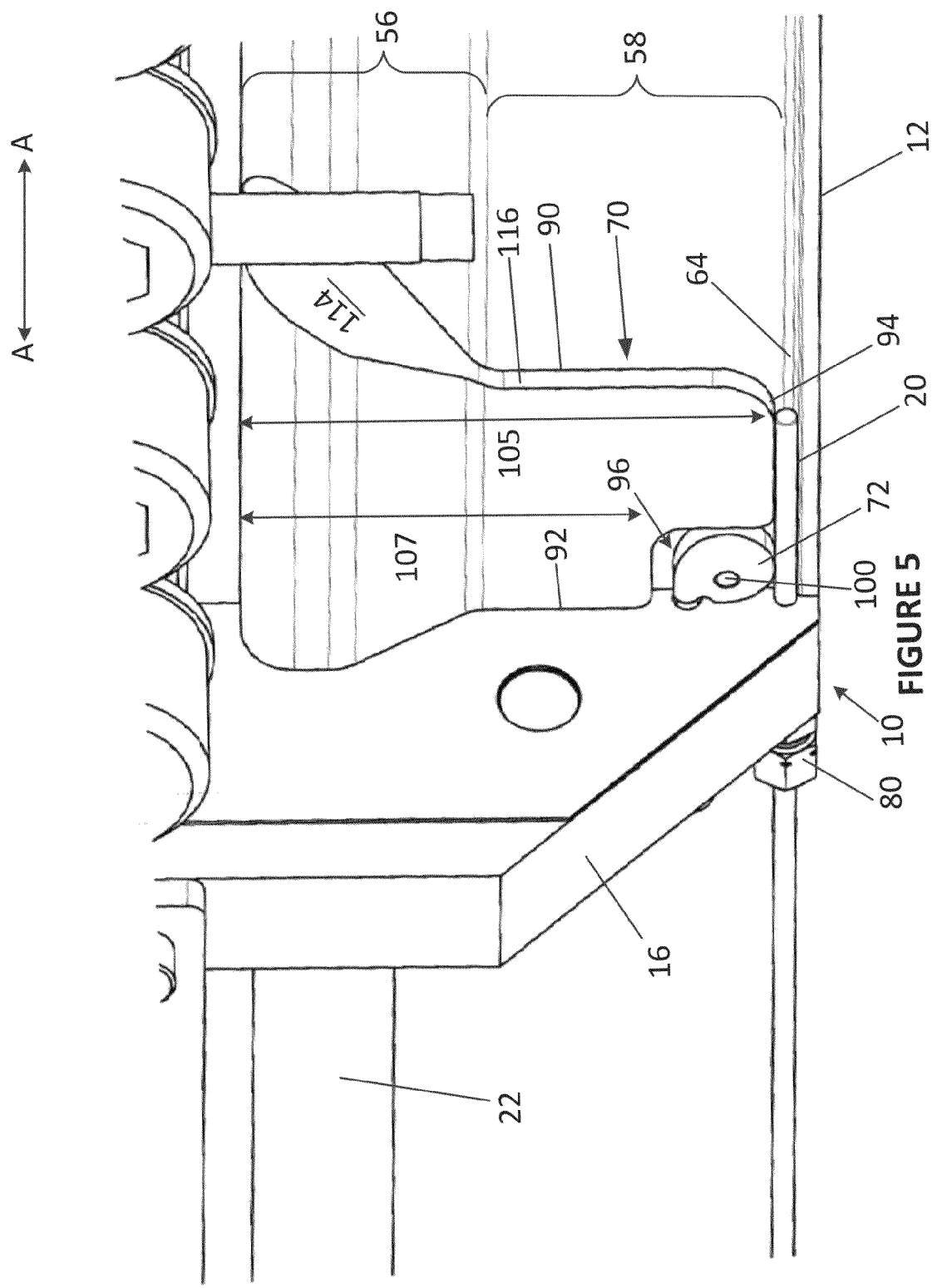
FIGS. 5 and 6 are exploded views of the deckle system in FIG. 4.
Figure 6:
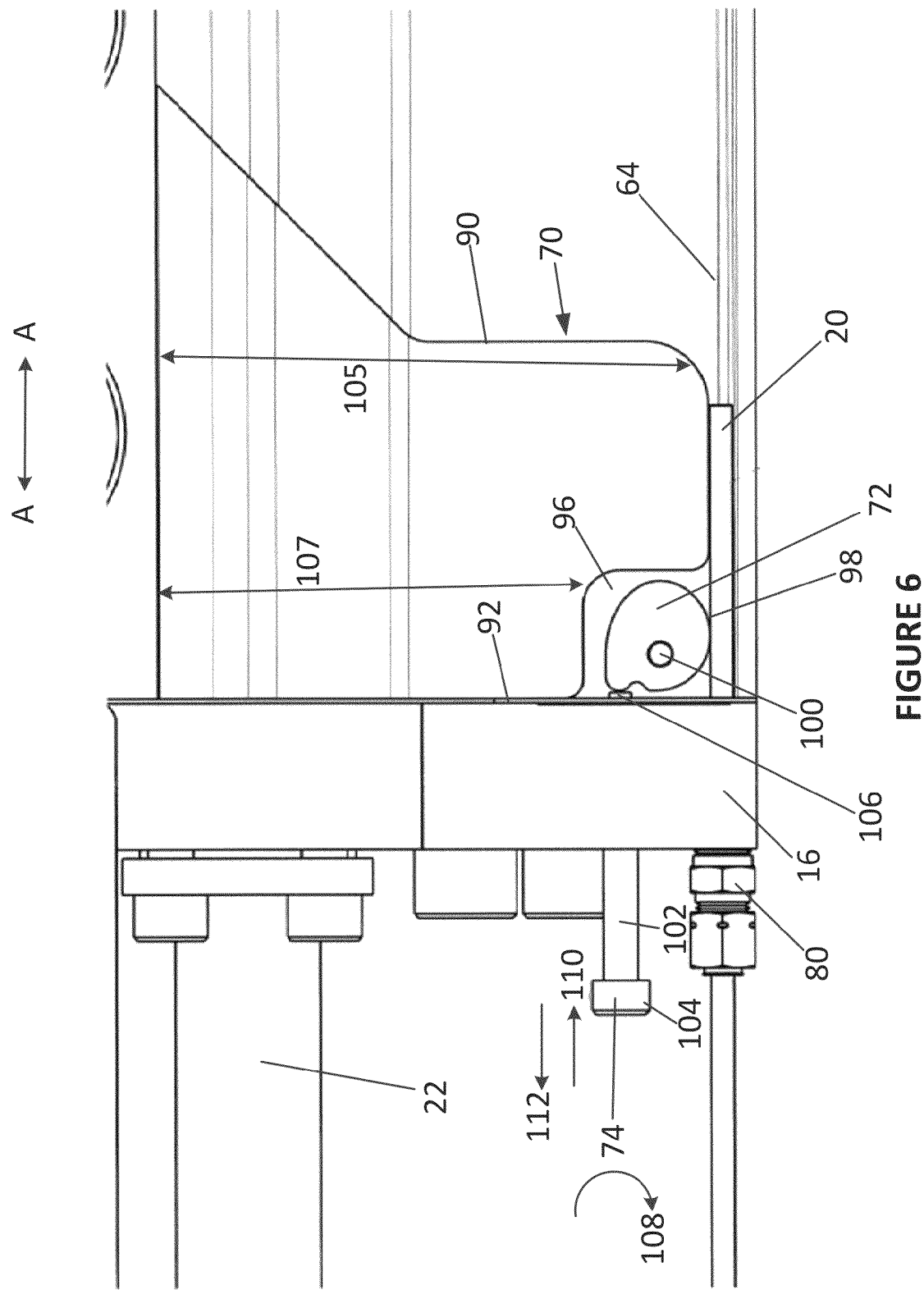

FIGS. 5 and 6 are exploded views of deckle system 10 from FIG. 4 positioned inside of extrusion die 8. In this embodiment, internal deckle members 70 have a leading end region 90, a trailing end region 92, and a downstream edge 94 extending between the leading end region and the trailing end region. In addition, internal deckle members 70 define a recess 96 adjacent the end plate 16 into which cam member 72 is positioned. Cam member 72 is positioned adjacent to deckle rod 20 and can bear against the rod, e.g., to force the rod toward the internal wall surfaces of the extrusion die, such as the converging wall surfaces in transition zone 64.

The leading end region 90 of internal deckle members 70 is disposed distally to the end plate 16 and has a leading edge that is advanceable into the flow passageway of extrusion die 8. The trailing end region 92 is disposed proximally to end plate 16 and, in the illustrated embodiments, shown as being in contact with the end plate. In operation, polymer can flow adjacent to and in contact with the leading end region 90 of internal deckle members 70, with the internal deckle members acting as a barrier to prevent polymer flow into the portion of the flow passageway extending behind (e.g., proximally) the end region of the internal deckle members. To adjust the width of outlet orifice 12, control rod 22 can push internal deckle members 70 distally within manifold 56 and pre-land channel 60, away from end plate 16.

In some embodiments, cam member 72 travels with internal deckle member 70 (e.g., in recess 96) as the internal deckle member translates within the extrusion die. In other embodiments, including the embodiment illustrated in FIGS. 5 and 6, cam member 72 remains stationary adjacent end plate 16 as the internal deckle members 70 translate away from end plate 16. In such embodiments, cam member 72 cams with the deckle rod 20 adjacent to end plate 16. A downwardly directed force provided by cam member 72 acting on deckle rod 20 pushes the rod in a downstream direction. The force may be greatest directly adjacent end plate 16 where cam member 72 is acting on deckle rod 20 but may also act on the distal end of the deckle rod that is positioned distally from the end plate 16.

Cam member 72 can have a variety of configurations to provide a camming force acting on deckle rod 20. As examples, cam member 72 can be a rotating or sliding piece that bears against deckle rod 20 in response to actuation by cam controller 74. In some embodiments, cam member 72 transforms rotary motion into linear force acting on the deckle rod. For example, cam member 72 may be an eccentric wheel or a cylinder with an irregular shape.

In the embodiment illustrated in FIGS. 5 and 6, cam member 72 has a generally disc-shaped configuration with a lobe and an outer pressing surface 98. Cam member 72 rotates about a pivot point 100 in response to actuation of cam controller 74. A rotation axis can be created for cam member 72, for example, by inserting a screw or bolt through a sidewall of extrusion die 8 and mounting cam member 72 to the screw or bolt. Cam member 72 cams with deckle rod 20 in response to actuation of the cam controller 74. Cam member 72 can press the deckle rod 20 in a downstream direction, for example in contact with the internal wall surfaces of extrusion die 8 within transition zone 64, thereby sealing the end region of the outlet orifice 12.

In some embodiments, cam member 72 is configured to cam with deckle rod 20 at a single location, thereby applying pressure at a single point on the rod. For example, cam member 72 may cam with deckle rod 20 at a single location that is distally spaced from end plate 16 yet proximally spaced from a leading end (e.g., distal end) of the deckle rod 20. In other embodiments, cam member 72 cams with the deckle rod 20 at multiple locations along the length of the rod. In such embodiments, cam member 72 may be shaped so that multiple portions of the cam member simultaneously press on different locations of the rod.

In general, cam member 72 is positioned within deckle system 10 so that cam surface 98 can press on an upstream edge 103 of the deckle rod 20. Deckle rod 20 is typically positioned adjacent to, and in some embodiments in contact with, downstream edge 94 of internal deckle member 70. Accordingly, cam surface 98 of cam member 72 may be positioned co-planar with downstream edge 94 of internal deckle members 70, such that cam surface 98 is generally flush with the downstream edge. In other embodiments, cam surface 98 may project below a plane defined by downstream edge 94 in the downstream direction.

Cam member 72 is positioned within recess 96 in the embodiment of FIGS. 5 and 6. Recess 96 can be a cutout in internal deckle members 70 between the leading end region 90 and the trailing end region 92 that is configured (e.g., sized and/or shaped) to partially surround and bound cam member 72, e.g., when the internal deckle members 70 are positioned against end plate 16. To provide recess 96, the internal deckle members 70 can have a height that is variable along the length of the internal deckle members between the leading end region 90 and the trailing end region 92. For example, as illustrated in FIGS. 5 and 6, the internal deckle members 70 can have a height 105 that is greater along the leading end region 90 than a height 107 along the trailing end region 96.

Cam member 72 is actuated by cam controller 74. In the embodiment of FIGS. 5 and 6, cam controller 74 comprises an elongated body 102 extending between a proximal end 104 and a distal end 106. The elongated body 102 moves axially in response to rotation of the proximal end 104, causing the distal end 106 to forcibly bear against, and thereby move, the cam member 72. In one embodiment, the elongated body 102 of cam controller 74 includes a threaded portion (not shown) that can threadingly engage with a threaded opening 107 (FIG. 4) in end plate 16. In such an embodiment, the elongated body 102 includes an externally threaded portion that engages with the internally threaded opening 101 of the end plate.

For example, in the embodiment of FIG. 6, cam controller 74 has an external threaded portion with an external threaded portion that includes a right handed thread configuration. When the proximal end 104 of the cam controller 74 is rotated in a clockwise direction 108, the distal end 106 of the cam controller advances into the interior of the extrusion die 8 in the direction 110. The direction of movement of the distal end 54 can be reversed by reversing the direction of rotation of the proximal end 104, withdrawing the distal end in the direction 112.

To allow cam controller 74 to act on cam member 72, the elongated body 102 of the cam controller is of a length sufficient to pass through the opening 107 in end plate 16 (FIG. 4) to press against the cam member 72. The length of the cam controller is the distance between the proximal end 104 and distal end 106 along an axis parallel to the transverse axis of extrusion die 8. In some embodiments, the elongated body 102 of the cam controller 74 is configured to forcibly bear against the cam member 72 with varying magnitudes of force, thereby varying the magnitude of sealing pressures applied by the deckle rod 20. In such embodiments, heavier sealing pressure can be applied by moving the distal end 106 of the cam controller 74 deeper into the interior of the extrusion die 8, causing the cam member 72 to bear down on the deckle rod 20 with a greater magnitude of force. Conversely, less sealing pressure can be applied by moving the distal end 106 of the cam controller 74 away from the cam controller. It should be appreciated that although cam member 72 and cam controller 74 have generally been described in connection with FIGS. 5 and 6 as an eccentric wheel and threaded rod, the disclosure is not limited to such a configuration. Other cam members and cam controller configurations, such as an electrically actuated cam controller and a linear actuator can be substituted in place of the cam member 72 and the cam controller 74 illustrated in FIGS. 5 and 6 without any loss of functionality.

Deckle system 10 illustrated in FIGS. 5 and 6 includes internal deckle members 70. As discussed above, internal deckle members 70 can be formed of one or more deckle members that are configured to be located within the flow passageway of extrusion die 8. The number and configuration of the internal deckle members 70 can vary, e.g., depending on the size and configuration of extrusion die 8. In the illustrated embodiment, the deckle system 10 has an upstream deckle member 114 and a downstream deckle member 116 that are integrally formed (e.g., permanently attached together) to define a single internal deckle member 70. Upstream deckle member 114, which may be referred to as a deckle quill, occupies the manifold region of the extrusion die flow passageway. Downstream deckle member 116, which may be referred to as a deckle flag or plug, is positioned in a downstream flow direction from the upstream deckle member and occupies the pre-land channel 60. In other embodiments, upstream deckle member 114 and downstream deckle member 116 are separate components that are not permanently attached. Further, in yet other embodiments, deckle system 10 does not include both upstream deckle member 114 and downstream deckle member 116 but instead includes only upstream deckle member 114 or only downstream deckle member 116.

Figure 7:
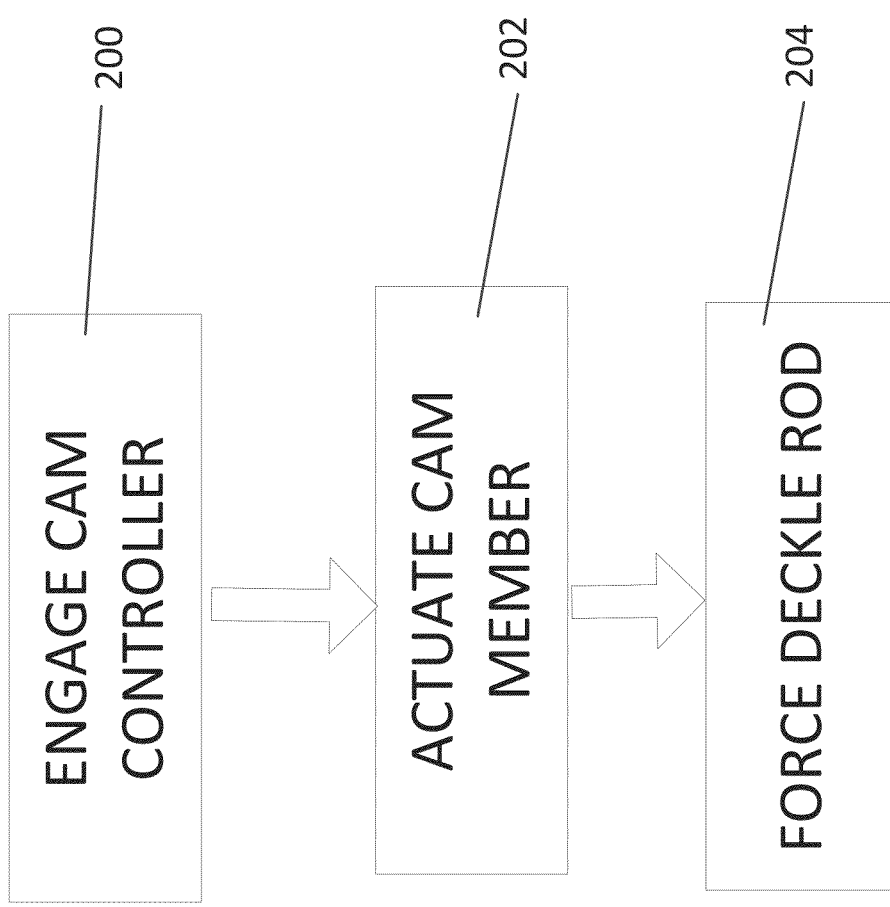
FIG. 7 is a flow diagram illustrating an example technique for operating an extrusion die having a flow passageway, an outlet orifice, and an internal deckle system.

An extrusion die system that includes an extrusion die and a deckle system can have a variety of different configurations, as described above with respect to FIGS. 1-6. FIG. 7 is a flow diagram illustrating an example technique for operating an extrusion die having a flow passageway, an outlet orifice, and an internal deckle system. The extrusion die can have a deckle rod, a rotatable cam member, and a cam controller. As shown, the techniques includes engaging a cam controller (200), actuating a cam member (202), and forcing a deckle rod (204).

In the technique of FIG. 7, an operator can engage the cam controller (200), for example, by turning a threaded screw or rod, activating an electromechanical driver, activating a hydraulic driver, or otherwise interacting with the cam controller. In response to engagement of the cam controller (200), the cam controller actuates the cam member (202). In one embodiment, the cam controller physically presses against the cam member. In another embodiment, the cam controller rotates a pivot axis of the cam member. Regardless, the cam controller causes the cam member to rotate and cam with the deckle rod. The camming action between the cam member and the deckle rod forces the deckle rod to seal an end region of the extrusion die adjacent the orifice outlet (204). For example, the camming action may press the deckle rod into contact with converging internal walls of the extrusion die, thereby establishing a physical barrier between the extrusion die walls and the deckle rod through which molten polymer cannot flow.

Various examples have been described. These and other examples are within the scope of the following claims.

What is claimed is:

1. An extrusion die having a manifold, an internal flow passageway, an orifice having an end region, and an internal deckle system, said internal deckle system comprising a downstream internal deckle member, a deckle rod, a cam member, and a cam controller, said downstream internal deckle member being located within said internal flow passageway and having a downstream edge alongside said deckle rod, said cam member being configured to rotate about a pivot point in response to actuation of said cam controller such that said cam member contacts said deckle rod and thereby forces said deckle rod to seal an end region of said orifice.

2. The extrusion die of claim 1, wherein said internal flow passageway extends from said manifold to said orifice, said internal deckle system further comprising an upstream internal deckle member located within said manifold, said downstream internal deckle member being the only internal deckle member located within said internal flow passageway between said upstream internal deckle member and said deckle rod.

3. The extrusion die of claim 1, wherein said downstream internal deckle member bounds a recess in which said cam member is received, and further comprising an end plate adjacent to which said cam member is mounted, wherein said recess is surrounded collectively by said downstream internal deckle member, said end plate, and said deckle rod.

4. The extrusion die of claim 1, further comprising an end plate adjacent to which said cam member is mounted, said downstream internal deckle member having a height, a length, a leading end region, and a trailing end region, said trailing end region being closer to said end plate than is said leading end region, said height being greater along said leading end region than along said trailing end region.

5. The extrusion die of claim 1, further comprising an end plate adjacent to which said cam member is mounted, said cam controller comprises an elongated body extending through an opening in said end plate and having a proximal end located outside of said extrusion die and a distal end located inside of said extrusion die, said proximal end being moveable to push said distal end forcibly against said cam member.

6. The extrusion die of claim 5, wherein said elongated body is configured to move axially in response to rotation of said proximal end such that said distal end bears forcibly against, and thereby moves, said cam member.

7. The extrusion die of claim 1, wherein said cam controller comprises an externally threaded elongated body and has a proximal end and a distal end, said elongated body being configured to move axially in response to rotation of said proximal end such that said distal end bears forcibly against said rotatable cam member, and wherein said rotatable cam member pivots in response to actuation of said cam controller.

8. The extrusion die of claim 1, wherein said cam member has a generally disc-shaped configuration with a lobe and a track surface that cams with said deckle rod in response to actuation of said cam controller.

9. The extrusion die of claim 8, wherein said downstream internal deckle member bounds a recess in which said cam member is received, said extrusion die further comprises an end plate adjacent to which said cam member is mounted, wherein said recess is surrounded collectively by said downstream internal deckle member, said end plate, and said deckle rod.

* * * * *